United States Patent

Chau et al.

[11] Patent Number: 5,838,721
[45] Date of Patent: Nov. 17, 1998

[54] SPREAD SPECTRUM COMMUNICATION EQUIPMENT

[75] Inventors: Kising Chau, Chiba; Yoshimi Takahashi, Tokyo, both of Japan

[73] Assignee: Uniden Corporation, Chiba, Japan

[21] Appl. No.: 870,557

[22] Filed: Jun. 6, 1997

Related U.S. Application Data

[62] Division of Ser. No. 355,773, Dec. 14, 1994, Pat. No. 5,671,248.

[30] Foreign Application Priority Data

Apr. 21, 1994 [JP] Japan ................................ 6-105011

[51] Int. Cl.$^6$ .............................. H04J 11/00; H04B 1/06
[52] U.S. Cl. ........................... 375/208; 375/220; 370/479
[58] Field of Search ....................... 375/200, 206, 375/208, 209, 210, 367; 370/320, 441, 479, 515

[56] References Cited

U.S. PATENT DOCUMENTS

| | | | |
|---|---|---|---|
| 5,465,269 | 11/1995 | Schaffner et al. | 375/200 |
| 5,479,442 | 12/1995 | Yamamoto | 375/206 |
| 5,528,624 | 6/1996 | Kaku et al. | 375/206 |
| 5,533,010 | 7/1996 | Tanaka | 375/208 X |
| 5,548,613 | 8/1996 | Kaku et al. | 375/208 |

FOREIGN PATENT DOCUMENTS

| | | |
|---|---|---|
| 1-117431 | 5/1989 | Japan . |
| 1-117528 | 5/1989 | Japan . |
| 1-177242 | 7/1989 | Japan . |
| 4-8047 | 1/1992 | Japan . |
| 5-264710 | 10/1993 | Japan . |

*Primary Examiner*—Young T. Tse
*Attorney, Agent, or Firm*—McDermott, Will & Emery

[57] ABSTRACT

A spread spectrum communication equipment comprises a correlator outputting a correlation output signal, a timing generator generating two timing signals in response to a correlation peak value, detecting circuits for detecting information of a correlation output signal based on either one of the timing signals, receiving information detected in either one of the detecting circuits and checking whether the information coincides with the ID code, a switching circuit for selecting connection or disconnection between the detecting circuits and a demodulator, and a control circuit responsive to outputs of the checking circuits for selecting connection or disconnection with the switching circuit.

11 Claims, 5 Drawing Sheets

SPREAD SPECTRUM COMMUNICATION EQUIPMENT

This application is a division of application Ser. No. 08/355,773 filed Dec. 14, 1994, now U.S. Pat. No. 5,671,248.

FIELD OF THE INVENTION

The present invention relates to a spread spectrum communication equipment, and more particularly to a spread spectrum communication equipment into which, if a plurality of receiving signals each having a different identical code, only those having the same ID code as that of the equipment itself can be inputted.

BACKGROUND OF THE INVENTION

In a communication equipment based on a spread spectrum communication system, characteristics such as resistance to interference or security of signals are improved by subjecting information signals, such as voice or data, to be transmitted in a form of code spreading using a PN code (spreading code) in the transmitting side to convert them to signals having a broader spectrum than that originally occupied by the signals, for transmission.

For this reason, in a spread spectrum communication equipment in the receiving side, it is necessary to execute so-called the reverse spreading in which the received signals are subjected to correlation demodulation by generating the same PN code as that in the transmitting side to compress the spreaded spectrum to a frequency spectrum.

For that purpose, in order to generate the same PN code in the receiving side at the same timing as in the transmitting side, a correlation peak value is extracted from a receiving signal by making use of the fact that PN code has sharp self-correlating characteristics, and a timing signal is generated to synchronize the PN code with respect to a position of the correlation peak value.

With the conventional type of spread spectrum communication equipment as described above, however, if a plurality of spectrum spreading communication equipments each using the same PN code are used simultaneously, correlation outputs (spreading reverse outputs) due to interference from the transmitting side are detected in the receiving side. For this reason, it is impossible to detect a correlation peak value produced by a receiving signal from a desired station (a partner station in the receiving side with which it is desired to communicate), which disadvantageously disables the communication.

In other words, with the conventional type of spread spectrum communication equipment, if a plurality of spread spectrum communication equipments each using the same PN code are used simultaneously, sometimes communication with a desired station may become impossible.

FIG. 4 and FIG. 5 show the problems as described above. That is in a case where two units of spread spectrum communication equipments (described as "transmitting side TX1, TX2" hereinafter) each using the same PN code exist in the transmitting side and also two units of spectrum spreading communication equipments (described as "receiving side RX1, RX2" hereinafter) each using the same PN code as that in the transmitting side above exist in the receiving side, assume as shown in FIG. 4 that sending power from the transmitting side TX1 to the receiving side RX1 is f1, sending power from the transmitting side TX2 to the receiving side RX2 is f2, interference power from the transmitting side TX1 to the receiving side RX2 is If1, and interference power from the transmitting side TX2 to the receiving side RX1 is If2. As the receiving side RX1 receives the sending power f1 from the transmitting side TX1 and the interference power If2 from the transmitting side TX2, two correlation peak values, namely a correlation peak value due to If2 and that due to f1, exist in a form of correlation output (not shown herein) as shown in FIG. 5. For this reason, it sometimes is impossible to accurately detect a correlation peak value for the transmitting side TX1 which is a desired station, and, in turn, it disables the communication with the desired station.

SUMMARY OF THE INVENTION

It is an object of the present invention to ensure communication with a desired station even if a plurality of spread spectrum communication equipments each using the same PN code are used simultaneously.

A spread spectrum communication equipment according to the present invention, generates at least one timing signal in response to a correlation peak value existing in a correlation output signal outputted from a correlating means by using information on the correlation output signal detected by a plurality of detecting means according to one of the timing signals respectively. A determination is made by a plurality of confirming means as whether the information detected by each detecting means coincides with the ID code previously stored therein. A control means receives a confirmation from the plurality of confirming means and connects a detecting means, to a demodulating means to selectively input and demodulates only receiving signals having the same ID code as that of for the equipment from a plurality of receiving signals each having the same PN code and different ID codes.

The spread spectrum communication equipment according to the present invention generates, in response to a correlation peak value existing in a correlation output signal outputted from a correlating means a timing signal corresponding to the correlation peak value with information in the correlation output signal detected by a detecting means according to the timing signal, and then makes a determination with a checking means as to whether the information coincides with the ID code previously stored therein. A switching means selects connection or disconnection between the detecting means and a demodulating means based on a result of checking by an ID checking means. Also a timing generating means receives a result of checking by the ID checking means and generates, when the ID code is not identical and also another correlation peak value exists in a correlation output signal outputted from a correlating means, a timing signal based on the other correlation peak value. As a result, the spread spectrum communication equipment according to the present invention selectively inputs and demodulates only receiving signals having the same ID code as that of the equipment from a plurality of receiving signals each having the same PN code and different ID codes.

Other objects and features of this invention will become understood from the following description with reference to the accompanying drawings.

DESCRIPTION OF THE PREFERRED INVENTION

Figure 1:
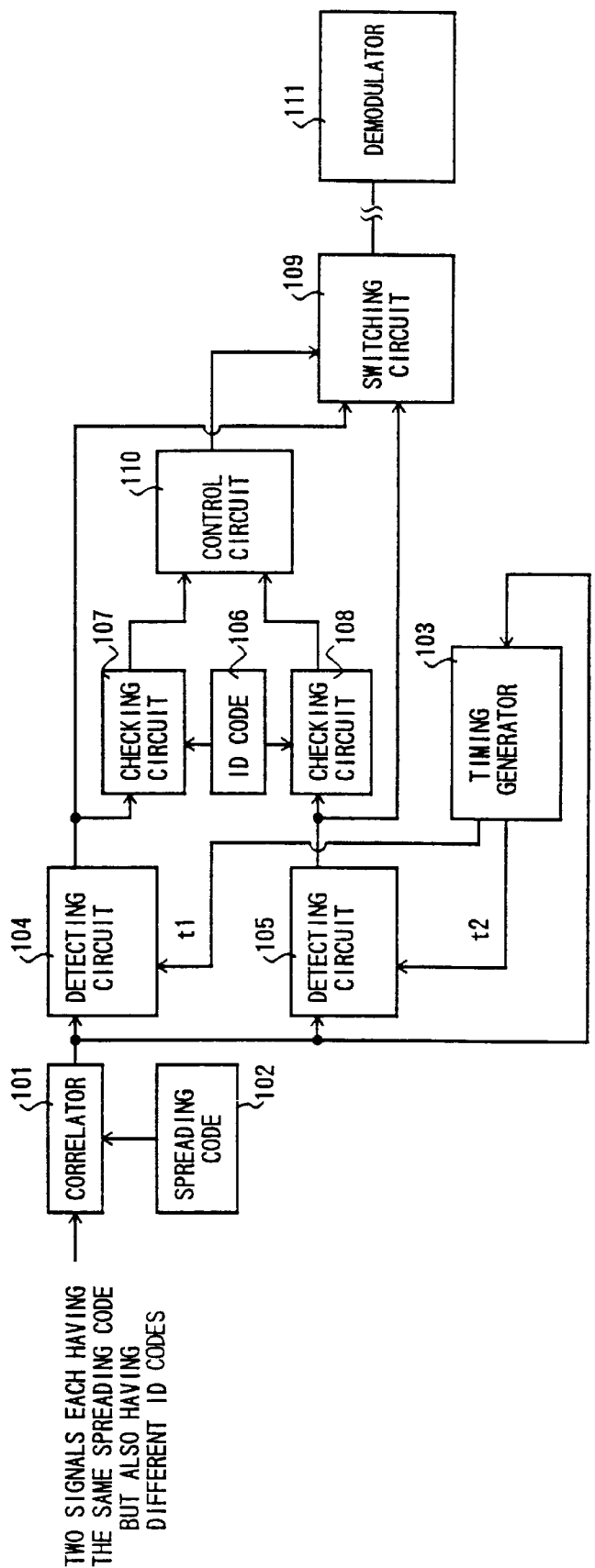
FIG. 1 is a block diagram of a spread spectrum communication equipment according to Embodiment 1 of the present invention.
Figure 2:
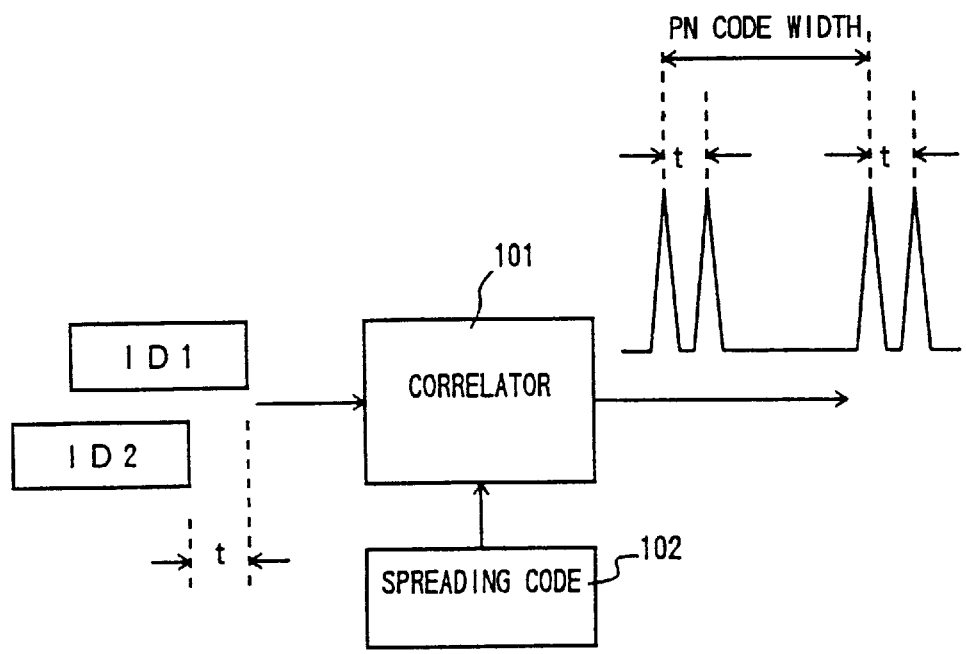
FIG. 2 is a drawing for explaining a correlation output signal (a signals indicating a correlation peak value delayed by time t) outputted from a correlator.

A detailed description for the spread spectrum communication equipment according to the present invention in the order of Embodiment 1 and Embodiment 2 is made with reference to the drawing.

In FIG. 1, Embodiment 1 of the present invention comprises: a correlator 101 which detects correlation between a received spreading code (PN code) included in a received signal and a spreading code 102 generated at the receiving side (reference PN code), and outputs a correlation output signal; a timing generator 103 which generates two timing signals t1, t2 in response to the two correlation peak values existing in a correlation output signal outputted from the correlator 101; detecting circuits 104, 105 each detecting information of a correlation output signal outputted from the correlator 101 according to one of the timing signals t1, t2 generated by the timing generator 103; a checking circuit 107 for inputting thereinto the information detected by the detecting circuit 104 and checking whether the information coincides with the ID code 106 previously stored therein; a checking circuit 108 for inputting thereinto the information detected by the detecting circuit 105 and checking whether the information coincides with the ID code 106 previously stored therein; a switching circuit 109 provided between the detecting circuits 104, 105 and a demodulator 111, described later, for selecting connection or disconnection between the detecting circuits 104, 105 and the demodulator; a control circuit 110 for inputting therein a result of checking by the checking circuits 107, 108 and selecting connection or disconnection by the switching circuit 109; and a demodulator 111 for demodulating a signal inputted through the switching circuit 109.

With the configuration described above, now description is made for operations thereof. In the spread spectrum communication equipment according to Embodiment 1, when two signals each having the same PN code as that for the equipment but also having different ID codes are received, or more specifically when receiving signals each having the same PN code as PN code 102 for the equipment but also having different ID codes ID1 or ID2 respectively are received, at first the correlator 101 executes reverse spreading using the PN code 102 and outputs a signal indicating a correlation peak value displaced by time t as a correlation output signal. Herein the time t corresponds to a time lag between timings for sending powers by two units of spread spectrum communication equipment having the same PN code 102 in the transmitting side.

The timing generator 103 generates, when a correlation output signal indicating correlation peak value displaced by time t is inputted thereinto from the correlator 101, timing signals (timing pulse array) t1, t2 having a PN cycle displaced by the time t according to displacement of these correlation peak values, and outputs the timing signals t1, t2 to the detecting circuits 104, 105.

The detecting circuit 104 receives a correlation output signal from the correlator 101, detects information of the correlation output signal according to the timing signal t1, and outputs the information to the checking circuit 107 and the switching circuit 109. Similarly the detecting circuit 105 receives a correlation output signal from the correlator 101, detects information of a correlation output signal according to the timing signal t2, and outputs the information to the checking circuit 108 and the switching circuit 109.

The checking circuits 107, 108 compare the inputted information thereinto respectively with the ID code 106 to check whether the information coincides with the ID code 106, and outputs a result of checking to the control circuit 110.

When receiving a result of checking from the checking circuits 107, 108, the control circuit 110 controls the switching circuit 109 so that an output from a detecting circuit (104 or 105) corresponding to a checking circuit (107 or 108) determined as having the same ID code as the ID code 106 is sent to the demodulator 111.

With this configuration, a received signal having the same PN code as that of the equipment and also having the same ID code is outputted through the switching circuit 109.

As described above, the spread spectrum communication equipment can only execute communication with a partner station having the same PN code as that of the equipment and also having the same ID code even if two signals each having the same PN code as that of the equipment but also having a different ID code are inputted.

Although the description of Embodiment 1 assumes a case where there is only one interfering station, it is clear that the same effects can be achieved by increasing a number of detecting circuits as well as a number of checking circuits even in a case where there are a plurality of interfering stations as shown in FIG. 1.

Figure 3:
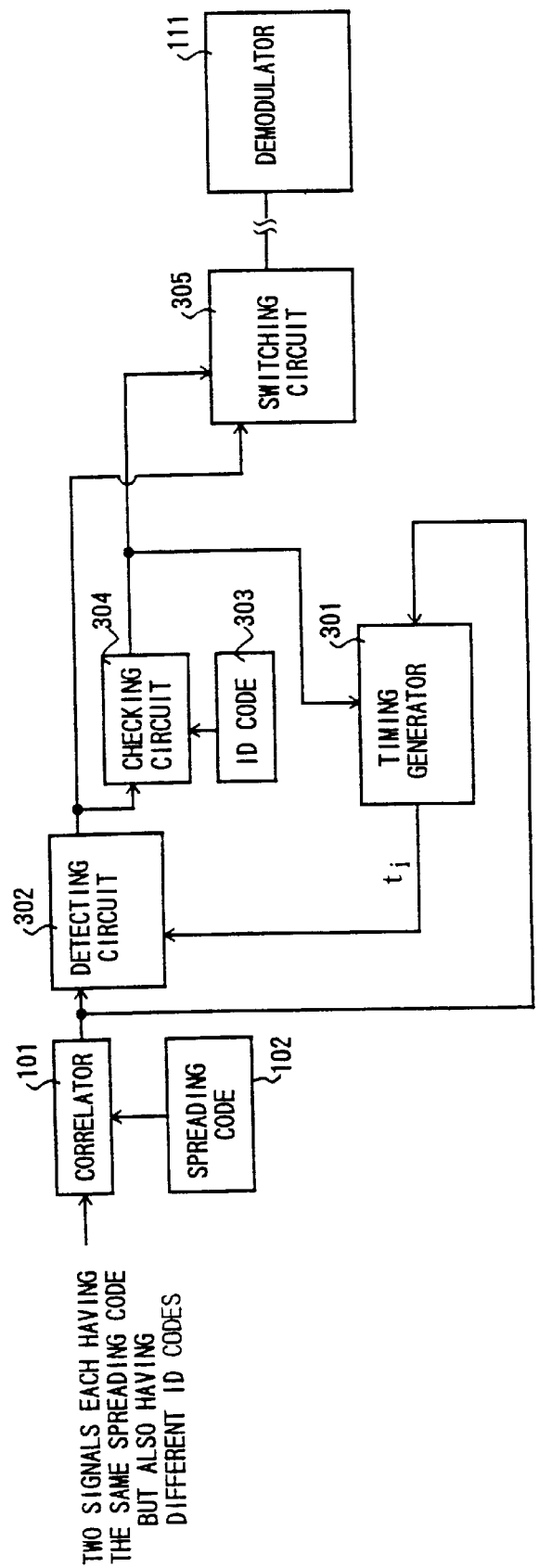
FIG. 3 is a block diagram of a spread spectrum communication equipment according to Embodiment 2 of the present invention.
Figure 4:
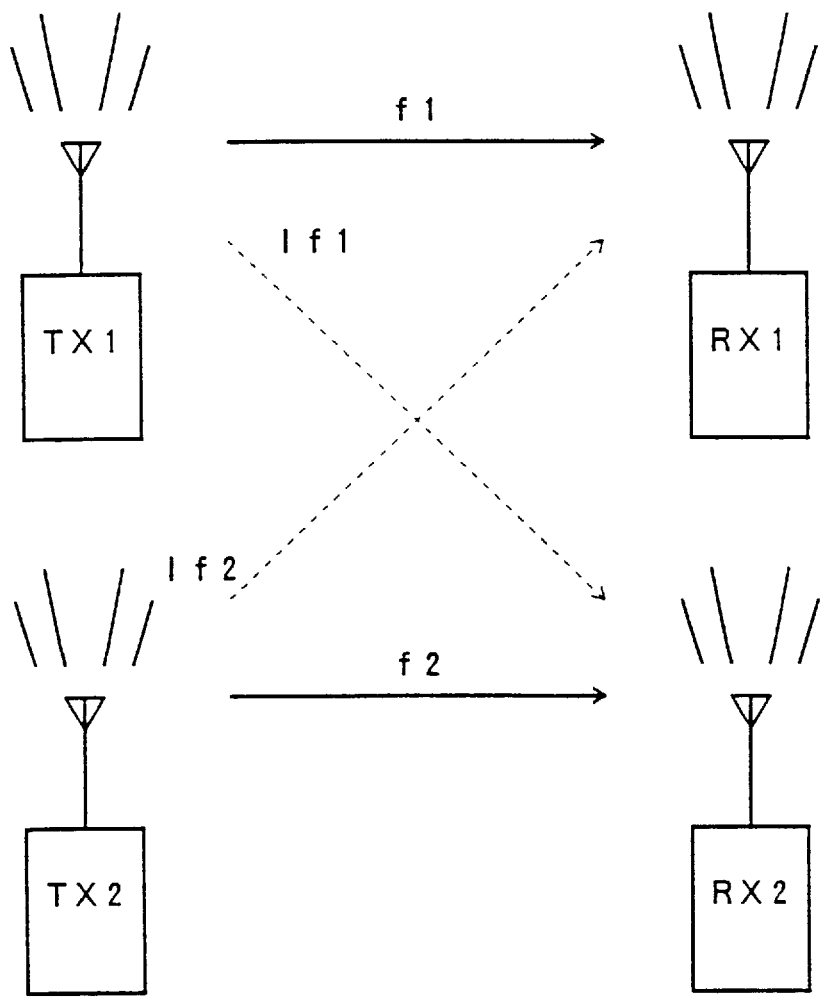
FIG. 4 is a drawing for explaining the problems in a conventional type of spectrum spreading communication equipment.
Figure 5:
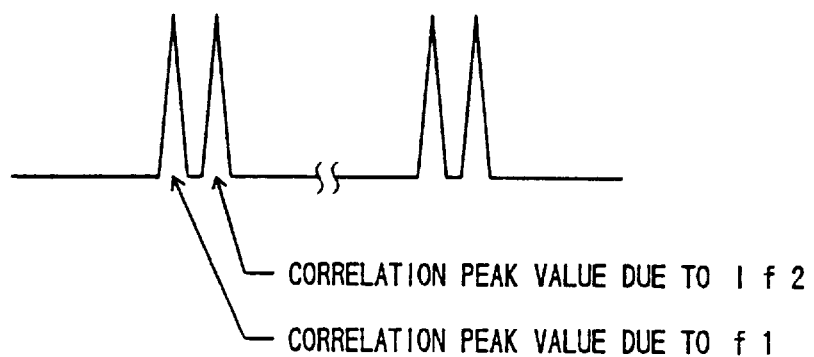
FIG. 5 is a drawing for explaining the problems in a conventional type of spectrum spreading communication equipment.

FIG. 3 is a block diagram of a spread spectrum communication equipment according to Embodiment 2 of the present invention comprising: a correlator 101 which detects correlation between a received spreading code (PN code) included in a received signal and a spreading code 102 generated in the receiving side (reference PN code) and outputs a correlation output signal; a timing generator 301 which generates a signal ti corresponding to a correlation peak value in response to a correlation peak value existing in a correlation output signal outputted from the correlator 101; a detecting circuit 302 for detecting information on a correlation output signal outputted from the correlator 101 according to the timing signals ti generated by the timing generator 301; a checking circuit 304 receiving the information detected by the detecting circuit 302 and checking whether the information coincides with the ID code 303 previously stored therein; a switching circuit 305 provided between the detecting circuit 302 and a demodulator 111, described later, for selecting connection or disconnection between the detecting circuits 302 and the demodulator 111; and a demodulator 111 for demodulating a signal inputted through the switching circuit 305.

With the configuration described above, now description is made for operations thereof. In the spread spectrum communication equipment according to Embodiment 2, when two signals each having the same PN code as that of the equipment but also having different ID codes are received, or more specifically when receiving signals each having the same PN code as PN code 102 of the equipment but also having different ID codes ID1 or ID2 respectively are received, at first the correlator 101 executes reverse spreading using the PN code 102 and outputs a signal indicating a correlation peak value displaced by time t as a correlation output signal. Herein the time t corresponds to a time lag between timings for sending powers by two units of spread spectrum communication equipment having the same PN code 102 in the transmitting side.

The timing generator 301 generates, when a correlation output signal indicating correlation peak values displaced by time t is inputted thereinto from the correlator 101, two timing signals (timing pulse array) having a PN cycle displaced by the time t according to displacement of these correlation peak values, and outputs timing signals to the detecting circuit 302 as a timing signal ti.

The detecting circuit 302 receives a correlation output signal from the correlator 101, detects information of the correlation output signal according to the timing signal ti, and outputs the information to the checking circuit 304 and the switching circuit 305.

The checking circuit 304 compares the inputted information thereinto with the ID code 303, checks whether the information coincides with the ID code 303, and in response generates a signal to the timing generator 301 and the switching circuit 305.

The switching circuit 305 selects connection or disconnection according to this signal from the checking circuit 304.

The timing generator 301 after receiving the output signal from the checking circuit 304, outputs, when the ID code does not coincide and also another correlation peak value exists in a correlation output signal outputted from the correlator 101, a timing signal based on the latest correlation peak value to the detecting circuit 302 as a timing signal ti. The detecting circuit 302 and the checking circuit 304 make a determination with the new timing signal ti as whether the ID code coincides with the ID code 303.

With the sequence of operations as described above, a receiving signal having the same PN code as that of the equipment and also having the same ID code is outputted from the switching circuit 305.

As described above, in Embodiment 2, even if two receiving signals each having the same PN code as that of the equipment but also having different ID code are inputted, communication with a partner station having the same PN code as that of the equipment and also having the same ID code can only be executed without fail.

Although description of Embodiment 2 assumes a case where there is only one interfering station, it is clear that the same effect can be achieved even in a case where there are a plurality of interfering stations.

As described above, the spread spectrum communication equipment, according to the present invention, has a correlating means for detecting a correlation between a received PN code included in a receiving signal and a reference PN code generated in the transmitting side and outputting a correlation output signal, and a demodulating means for receiving and demodulating the correlation output signal. A timing generating means generates at least one timing signal in response to a correlation peak value existing in a correlation output signal outputted from the correlating means. A plurality of detecting means each detects information of the correlation output signal outputted from the correlating means based on one of the timing signals generated by the timing generating means. A plurality of ID checking means each receives information detected by the detecting means and checks whether the information coincides with ID code previously stored therein. A switching means provided between the plurality of detecting means and the demodulating means selects connection or disconnection between the plurality of detecting means and the demodulating means. A control means for receiving a result of checking by the plurality of ID checking means selects connection or disconnection of the switching means. Hence, communication with a desired station can be executed without fail even if a plurality of spread spectrum communication equipments using the same PN code are used simultaneously.

The spread spectrum communication equipment, according to the present invention has a correlating means for detecting correlation between a received PN code included in a receiving signal and a reference PN code generated in the transmitting side and outputting a correlation output signal, and a demodulating means for receiving and demodulating the correlation output signal. A timing generating means is provided for generating, in response to a correlation peak value existing in a correlation output signal outputted from the correlating means, a timing signal corresponding to the correlation peak value. A detecting means detects information of the correlation output signal outputted from the correlating means according to a timing signal from the timing generating means. An ID checking means receives the information detected by the detecting means and checks whether the information coincides with the ID code previously stored therein. A switching means provided between the detecting means and the demodulating means is provided for selecting connection or disconnection between the detecting means and the demodulating means. The switching means selects connection or disconnection thereof according to output of the ID checking means. The timing generating means receives a result of checking by the ID checking means and generates, when the ID code does not coincide and also another correlation peak value exists in a correlation output signal outputted from the correlating means, a timing signal based on the latest correlation peak value. Hence, communication with a desired station can be executed without fail even if a plurality of spread spectrum communication equipments using the same PN code are used simultaneously.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spread spectrum communication equipment comprising:
    a correlator for detecting correlation between a received PN code included in a receiving signal and an internally provided reference PN code, and in response, outputting a correlation output signal;
    a demodulator for receiving and demodulating the correlation output signal from said correlator;
    a timing generator for generating, in response to a correlation peak value existing in said correlation output signal, a timing signal corresponding to said correlation peak value;
    a detector for detecting information of said correlation output signal outputted from said correlator according to the timing signal from said timing generator;
    an ID checking means for receiving the information detected by said detector and checking whether the information coincides with a prestored ID code; and
    a switch provided between said detector and said demodulator for selecting connection or disconnection between said detector and said demodulator.

2. A spread spectrum communication equipment according to claim 1, wherein, said timing generator receives an output from said ID checking means and generates, when said ID code does not coincide and also another correlation peak value exists in the correlation output signal outputted from said correlator, the timing signal based on latest correlation peak value.

3. A spread spectrum communication equipment according to claim 1, wherein said switch is responsive to an output of said ID checking means selects connection or disconnection thereof.

4. In a spread spectrum communication equipment for providing communications between a plurality of stations, a circuit for distinguishing a first received signal over a second received signal having the same pseudo-noise code as the first received signal comprising:

a receiving circuit responsive to said first and second received signal for detecting correlation between a received pseudo-noise code and a reference pseudo-noise code, and a checking circuit responsive to an output signal of the receiving circuit and a reference identification code for generating a first control signal if said output signal coincides with said reference identification code, and for generating a second control signal if said output signal does not coincide with said reference identification code.

5. The circuit of claim 4, further comprising a switching circuit for supplying said output signal to a demodulator in response to said first control signal.

6. The circuit of claim 5, wherein said switching circuit prevents said output signal from being supplied to said demodulator in response to said second control signal.

7. The circuit of claim 4, wherein said receiving circuit comprises a detecting circuit for detecting identification information based on the correlation between the received pseudo-noise code and the reference pseudo-noise code to generate said output signal.

8. The circuit of claim 7, further comprising a timing generator responsive to the correlation between the received pseudo-noise code and the reference pseudo-noise code to supply said detecting circuit with a timing signal.

9. The circuit of claim 8, wherein said timing signal defines said identification information.

10. A spread spectrum communication receiver, comprising:

a circuit arranged for receiving PN coded receiving signals transmitted by multiple remote transmitters, each PN coded receiving signal including an ID code unique to a respective transmitter;

a correlator unit for generating a PN code signal at a prescribed timing as a reference signal, and correlating the received PN coded receiving signals with said reference signal to produce a correlation output signal;

a timing signal generator responsive to said correlation output signal for producing multiple timing signals displaced in time from each other; and a demodulator circuit responsive to said correlation output signal and an output of said timing signal generator for demodulating a correlation signal corresponding to said PN code signal.

11. A method of processing spread spectrum signals received from multiple transmitters producing a PN code sequence and each having a unique ID code, comprising the steps of:

correlating the PN code sequence of received spread spectrum signals with an internally generated reference PN code sequence to produce a correlation output signal;

producing multiple timing signals, displaced in time from each other by a PN code sequence cycle time, in response to correlation peaks in said correlation output signal;

detecting and comparing a transmitter ID code associated with each correlation output signal; and demodulating said correlation output signal in accordance with said timing signals and transmitter ID codes.

* * * * *